United States Patent
Gillis et al.

(10) Patent No.: US 8,202,032 B2
(45) Date of Patent: Jun. 19, 2012

(54) PLUG FINISHING SYSTEM AND TOOL THEREFOR

(75) Inventors: Timothy F. Gillis, Florence, MA (US); Mark Joseph Guthrie, West Springfield, MA (US); Richard L. Belinda, Westfield, MA (US); Walter Joseph Fallows, III, Florence, MA (US); Tad A. Weiss, Westhampton, MA (US); Joseph A. Pieciak, Jr., West Springfield, MA (US)

(73) Assignee: Handy & Harman, White Plains, NY (US)

( * ) Notice: Subject to any disclaimer, the term of this patent is extended or adjusted under 35 U.S.C. 154(b) by 0 days.

(21) Appl. No.: 13/336,404

(22) Filed: Dec. 23, 2011

(65) Prior Publication Data

US 2012/0094053 A1    Apr. 19, 2012

Related U.S. Application Data

(62) Division of application No. 12/150,135, filed on Apr. 25, 2008, now Pat. No. 8,104,248.

(60) Provisional application No. 60/914,377, filed on Apr. 27, 2007, provisional application No. 60/999,984, filed on Oct. 23, 2007.

(51) Int. Cl.
*F16B 37/14*    (2006.01)

(52) U.S. Cl. ............... 411/372.5; 411/377; 411/429; 52/650.3

(58) Field of Classification Search ........... 52/745.05, 52/745.06, 747.1, 650.3, 483.1, 289; 411/372.5, 411/377, 429
See application file for complete search history.

(56) References Cited

U.S. PATENT DOCUMENTS

| | | | |
|---|---|---|---|
| 293,726 | A | 2/1884 | Fancher |
| 2,292,557 | A | 8/1942 | Wilson |
| 3,263,721 | A | 8/1966 | Ewaskowitz |
| 5,160,226 | A | 11/1992 | Lee, II |
| 5,516,248 | A | 5/1996 | DeHaitre |
| 5,749,670 | A | 5/1998 | Astor |
| 5,987,837 | A | 11/1999 | Nelson |
| 6,050,765 | A | 4/2000 | McGovern et al. |
| 6,293,062 | B1 | 9/2001 | Chen |
| 6,508,010 | B2 | 1/2003 | Hanson et al. |
| 6,616,391 | B1 * | 9/2003 | Druschel ............... 411/387.2 |
| 7,029,220 | B2 | 4/2006 | Fujiyama et al. |
| 7,334,976 | B2 | 2/2008 | Dicke |
| 2007/0224019 | A1 | 9/2007 | Hale |

* cited by examiner

*Primary Examiner* — Jeanette E Chapman
*Assistant Examiner* — James Buckle, Jr.
(74) *Attorney, Agent, or Firm* — Alix, Yale & Ristas, LLP (57) ABSTRACT

A plug finishing system involves forming a counterbore in a cover board above the head of a fastener as it is driven by a specially constructed driver. A plug, which is dimensioned for the counterbore and has a reduced portion, is inserted into the counterbore and positioned so that its exterior surface is coplanar with the exterior surface of the cover board.

6 Claims, 12 Drawing Sheets

PLUG FINISHING SYSTEM AND TOOL THEREFOR

CROSS-REFERENCE TO RELATED APPLICATIONS

This application is a divisional of U.S. patent application Ser. No. 12/150,135 filed Apr. 25, 2008 now U.S. Pat. No. 8,104,248 which application claims the priority of U.S. Provisional Application No. 60/914,377 filed Apr. 27, 2007 and U.S. Provisional Application No. 60/999,984 filed Oct. 23, 2007, the entire disclosures of which applications are incorporated herein by reference.

FIELD

The present disclosure relates generally to a method for securing cover boards to supporting members without visible fasteners and for components and tools useful in such method. The method, components and tools are particularly advantageous when used to secure a deck board to supporting members or to secure a trim board to a support member.

BACKGROUND

Fasteners, such as nails or screws, for securing a cover board to supporting members such as joists, are well known. Typically, the fastener is disposed through the exposed face of the cover board and into the supporting member leaving the fastener head visible. Recently, so called "hidden" systems which fasten cover boards to support members without a visible fastener in the exposed face of the cover board have come into demand.

One conventional method of providing a hidden system involves first drilling a throughbore and a counterbore into the cover board and subsequently disposing a fastener through the cover board and into a supporting structure with the head of the fastener recessed below the surface of the cover board in the counterbore. A plug is disposed in the counterbore to hide the fastener head from view. This method requires pre-drilling the throughbore and counterbore using a first tool followed by fastener insertion using a second tool and then plug insertion. Such methods are very time consuming. Other hidden fastener systems require extensive preparation of the system components such as installing tracks on the joists, pre-drilling slots in cover boards for fasteners, or gluing the cover boards to the joists. Some hidden decking systems must be substantially installed from below—a time consuming, expensive and potentially dangerous procedure. In addition, the widespread use of composite material presents special problems in efficiently achieving hidden systems.

SUMMARY

Briefly, one aspect of the disclosure is a method of fastening a cover board to a support with a mechanical fastener wherein the counterbore is formed in the cover board as the mechanical fastener is driven through a portion of the cover board in a single operation.

Another aspect of the disclosure is a method of fastening a cover board to a support with a mechanical fastener wherein the counterbore is formed in the cover board after the mechanical fastener is disposed at a pre-established depth within the cover board and a specially configured plug is inserted into the counterbore.

Another aspect of the present disclosure is a driver tool for rotationally driving a mechanical fastener which cuts a counterbore in a single operation and sets the fastener at a pre-established depth.

A better understanding will be obtained from the following detailed description of the presently preferred, albeit illustrative, embodiments.

Briefly, a method of fastening a cover board to a support comprises providing a plurality of substantially identical plugs having the same material composition as that of the cover board. The cover board is disposed on the support and fastened into position by fasteners. Fasteners are driven through the cover board partially into the support at a pre-established depth. A counterbore is formed in the cover board above the head at the same time a fastener is driven through the cover board. A plug is then disposed in the counterbore and positioned so the exterior face of the cover board and the plug are co-planar. The counterbore is preferably formed by the fastener head as the fastener head is driven to a position between the opposed faces of the cover board. The fastener is driven by a driver and the counterbore is formed while the driver is interengaged with the fastener head. The counterbore has a diameter that is slightly smaller than the fastener head.

The cover board is preferably selected from a natural wood deck board, a deck board comprised of a polymer, composite materials and/or cellular PVC, natural wood trim board or a trim board comprised of a polymer, composite materials and/or cellular PVC.

Preferably the plug has a reduced portion which is initially inserted into the cover board. The plug has the same material as the cover board and in some embodiments a tapered angle for a given material defines the tapered shape. The plug, in one embodiment, has an enlarged cylindrical portion and a co-axial reduced cylindrical portion.

A driver for the fastener comprises a generally elongated body including a opposed first and second ends. A tool engagement portion at the first end is adapted for fastening the driver to a tool so that a rotational torque and axial force can be applied to the driver. A fastener bit at the second end is configured to mechanically interengage with the head of the fastener.

The fastener bit has a profile selected from the group consisting of a slotted, cross, Torx™, square, polygonal and splined configurations. A spring loaded washer is mounted to the body and axially engages with the cover board to limit the penetration depth of the fastener. The spring is preferably a collapsible conical compression spring. The washer is comprised of a plastic or mar-resistant material. The body of the driver has a pair of longitudinally spaced annular shoulders. The spring engages one shoulder and biases the washer against the second shoulder.

DETAILED DESCRIPTION

With reference to FIGS. 1A through 1F, a plug finishing method for fastening a cover board 10 to a support 12 is illustrated in various representative sequential steps. The illustrated method may be employed for fastening decking manufactured from composite lumber to support joists. The plug finishing method may also be employed in connection with numerous other applications, including trim finishing.

Figure 1A:
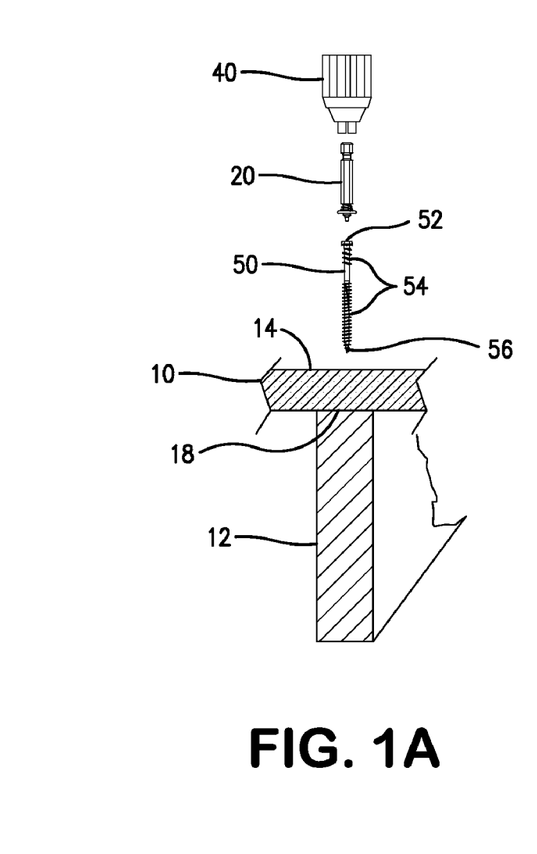
FIGS. 1A through 1F are side views, partly in schematic and partly in section, illustrating a plug finishing method in conjunction with a representative cover board and a joist.
Figure 1B:
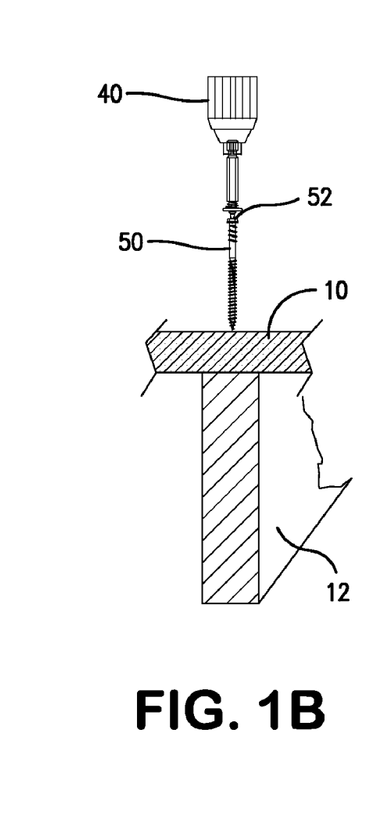
Figure 1C:
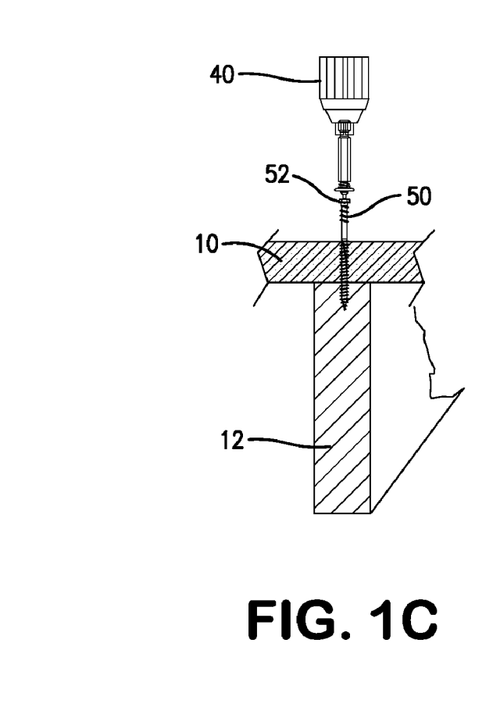
Figure 1D:
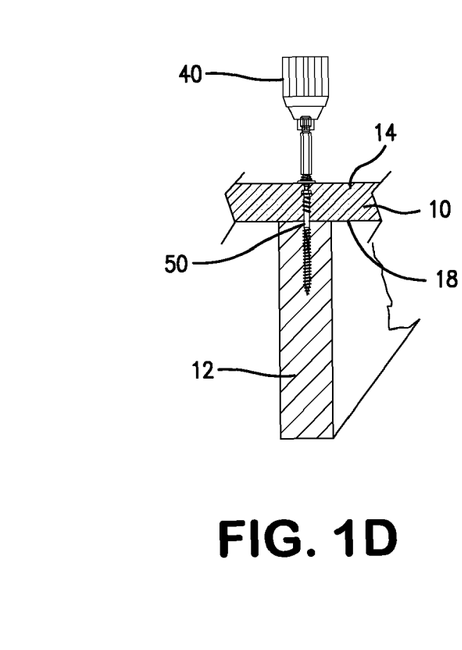

With reference to FIG. 1A, a driver 20 is received in a chuck 40 of a drill or other torque tool (not illustrated). The bit end of the driver engages the head 52 of a fastener 50. As illustrated in FIGS. 1B through 1D, the fastener is gradually driven through the composite lumber into the joist until the head is set at a pre-established depth below the top surface 14 of the cover board. While the fastener is being driven, the head of the fastener is configured to form a counterbore 16 in the composite lumber above the head (See FIG. 16). In a preferred method, the counterbore is approximately ¼ to 5/16 inch deep.

Figure 1E:
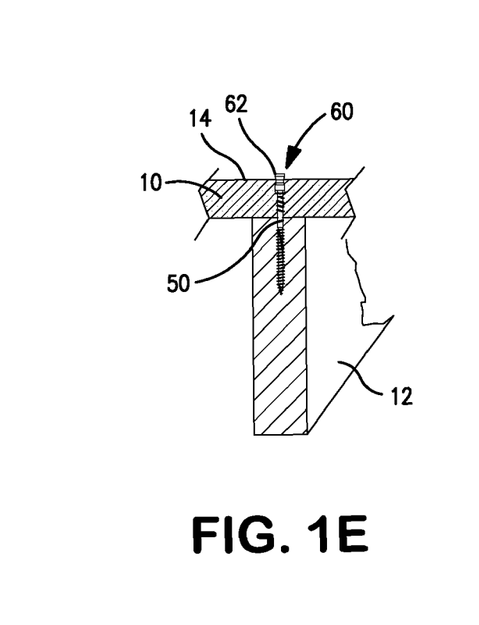
Figure 1F:
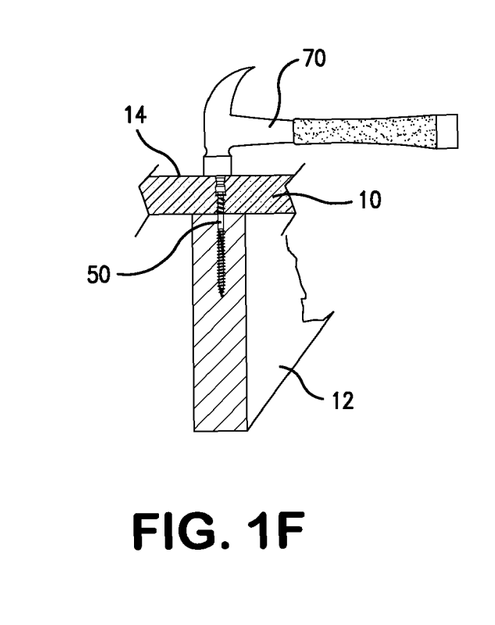
Figure 2A:
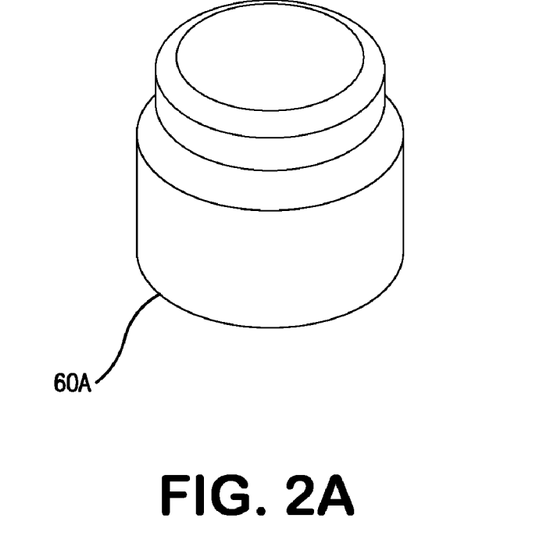
FIGS. 2A and 2B are respectively perspective and diagrammatic side views of an inverted plug which may be employed in the method illustrated in FIGS. 1A through 1F.
Figure 2B:
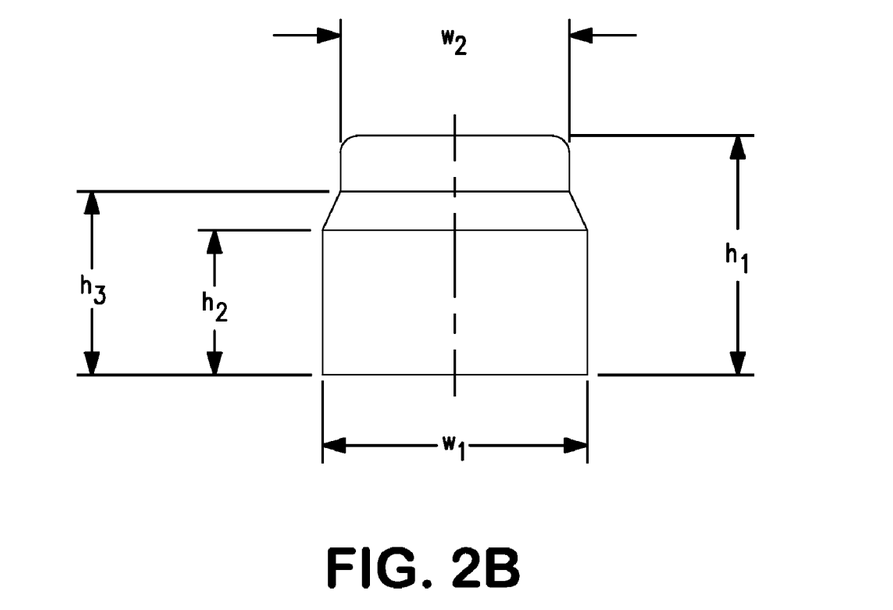
Figure 3A:
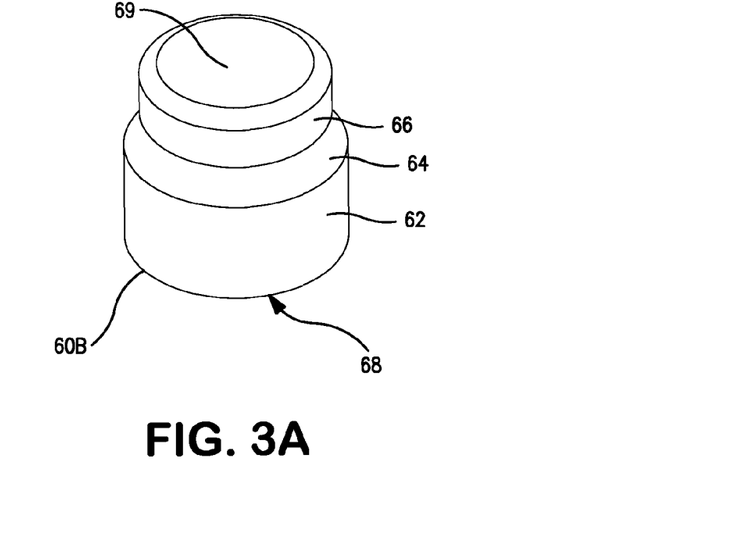
FIGS. 3A and 3B are respectively perspective and diagrammatic side views of another inverted plug which may be employed in the plug finishing method of FIGS. 1A through 1F.
Figure 3B:
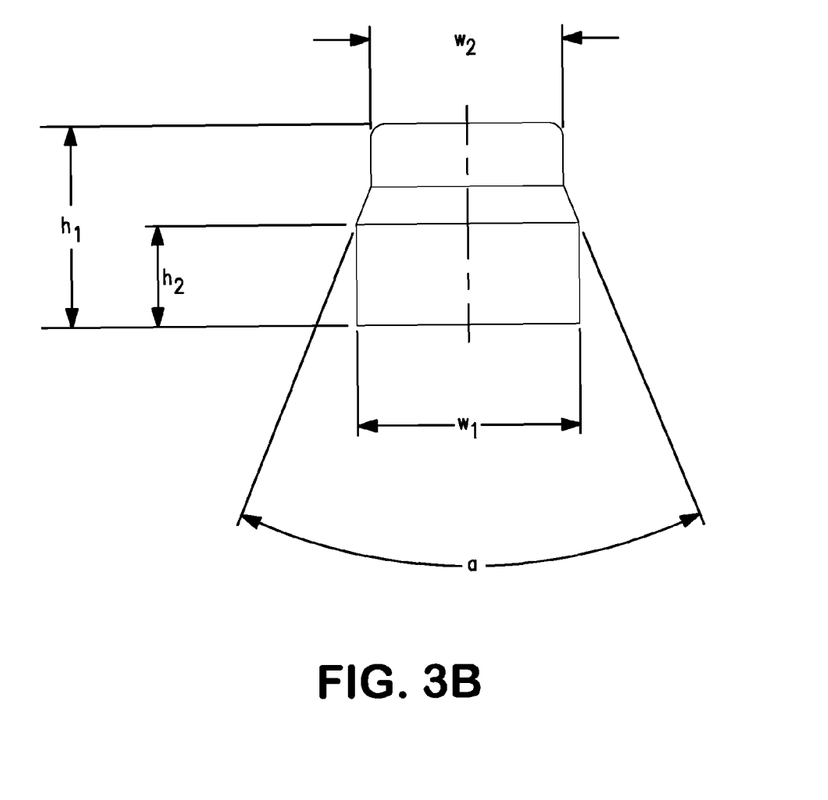
Figure 4A:
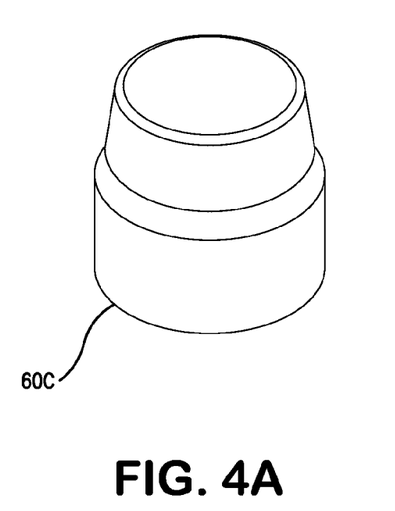
FIGS. 4A and 4B are respectively perspective views and diagrammatic side views of another inverted plug which may be employed in the plug finishing method of FIGS. 1A through 1F.
Figure 4B:
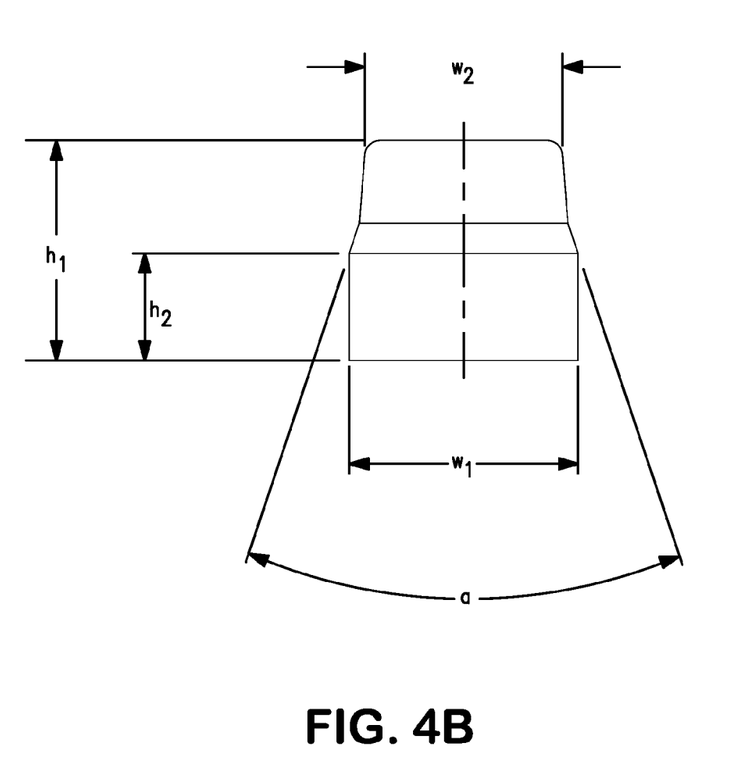

With reference to FIGS. 1E and 1F, a specially configured plug 60 is removed from a kit of identical such plugs. The selected plug 60 is then inserted into the counterbore 16. The plug is formed of the same material as the composite lumber and is dimensioned so that the top portion 62 snugly engages against the upper walls of the counterbore. A hammer 70 or similar tool is then employed to tap the plug until it is flush or co-planar with the top surface 14 of the cover board (or the composite material).

The foregoing described method is replicated for several fasteners at spaced locations along the deck board to secure the board to spaced joists. Preferably a bag contains numerous, substantially identical plugs which are selected for each formed counterbore and tapped into position.

The method uses a driver 20 to drive the fastener 50 partially through the cover board 10 and into the support member 12. A preferred fastener is one such as disclosed in U.S. patent application Ser. No. 11/973,906 filed Oct. 11, 2007, the disclosure of which is incorporated in its entirety by reference. The fastener 50 includes threaded portions that chew into the composite/plastic material as they cut into the board thereby removing material. The head 52 and particularly the fastener head periphery and underside is configured to remove material from the cover board by shearing off remaining strands and fragments and capture same as the head sinks into the cover board to thereby form a counterbore 16 therein in a single operation. A single operation means that the counterbore 16 is formed in the cover board 10 at the same time the fastener is being driven through the cover board.

A counterbore is an aperture in the cover board having a cross sectional width greater than the maximum cross sectional width of the fastener threads 54. Typically, the diameter of the counterbore will be the same or slightly smaller diameter than the diameter of the fastener head 52 being used. For some materials, the counterbore may have a slightly smaller diameter due to the resiliency of the composite material. The driver 20 drives the fastener 50 which also forms the counterbore. The plug 60 is advantageously inserted into the counterbore 16 to hide the fastener head 52 from view.

For descriptive purposes, the method and components will be described in simplified fashion with relation to a deck system. It should be noted that the figures exemplify various aspects of the method and components but do not illustrate a complete deck system. It should also be noted that the method and components are useful in other environments and using other combinations and assembly sequences and all such uses are part of this disclosure. Cover boards, for example decking boards, are typically supported on a structure, such as a frame or support member, for example, rim joists, ledgers and joists. The support structure may be constructed in a conventional manner.

A first cover board is disposed over support members (one representative joist in FIG. 1). This cover board will have an exterior face 14 visually apparent to the user and an opposing support face 18 adjacent the joists. Typically, the cover board 10 will be fastened to each joist 12 using two spaced fasteners such as deck screws. The position of the fasteners is noted on the cover board. A hole spacer (not illustrated) can be used to provide consistent placement of the fasteners with respect to the cover board. In one embodiment the hole spacer is a plate with one or more apertures therethrough and an arm angularly projecting from one end of the plate. The arm is positioned adjacent one longitudinal edge of the cover board to align the hole spacer perpendicularly to the longitudinal axis of that cover board. When aligned, the plate apertures correspond to the desired position of fasteners in the cover board. The aperture positions can be marked on the cover board so that fasteners can later be driven in the marked positions. Alternatively, the hole spacer can be left adjacent the cover board, and the fastener can be driven through the aperture or a drill bit can be driven through the aperture.

As shown in FIGS. 1A through 1D, the driver 20 is coupled to a drill chuck 40. A fastener head 52 is interengaged to the fastener bit 22 of the driver. Axial and rotational force is applied to the fastener to drive the fastener tip 56 through the cover board at the previously noted positions. As the fastener is driven through the cover board, the counterbore 16 is formed. The counterbore is preferably formed by the fastener as previously described. However, the counterbore could be formed by a material removal section or by a combination of the fastener and material removal section. The driver body intermediate the driver portion and the fastener bit optionally comprises a material removal section (not illustrated). The material removal section has a second cross sectional width that is advantageously greater than the fastener bit cross sectional width. In some embodiments the material removal section can remove material from the cover board to form a counterbore therein or to ream or "clean" a previously formed counterbore. Advantageously, the material removal section can include one or more flutes to provide a cutting edge and an exit path for the removed cover board material.

The driver 20 preferably has a stop 30. When the stop 30 contacts the cover board or engages the cover at a sufficient force determined by a pre-established depth, the axial force is interrupted by the disengagement of the fastener bit from the fastener head. The driver is then removed from the counterbore. The sequence of driving the fastener and forming the counterbore is advantageously performed in a single operation while the fastener bit 22 remains interengaged to the fastener head 52.

As shown in FIG. 1F, a plug 60 is disposed within the counterbore. The plug 60 is specially dimensioned and configured as further described below. Typically the plug will closely match the appearance of the cover board exterior face for aesthetic reasons. This sequence is repeated as desired to fasten the first cover board to the remaining joists. A second cover board is positioned over the joists adjacent to the first cover board. The position of the fasteners is noted on the second cover board, fasteners are driven through the second cover board into each joist as described above and a plug is disposed within each counterbore.

Figure 5:
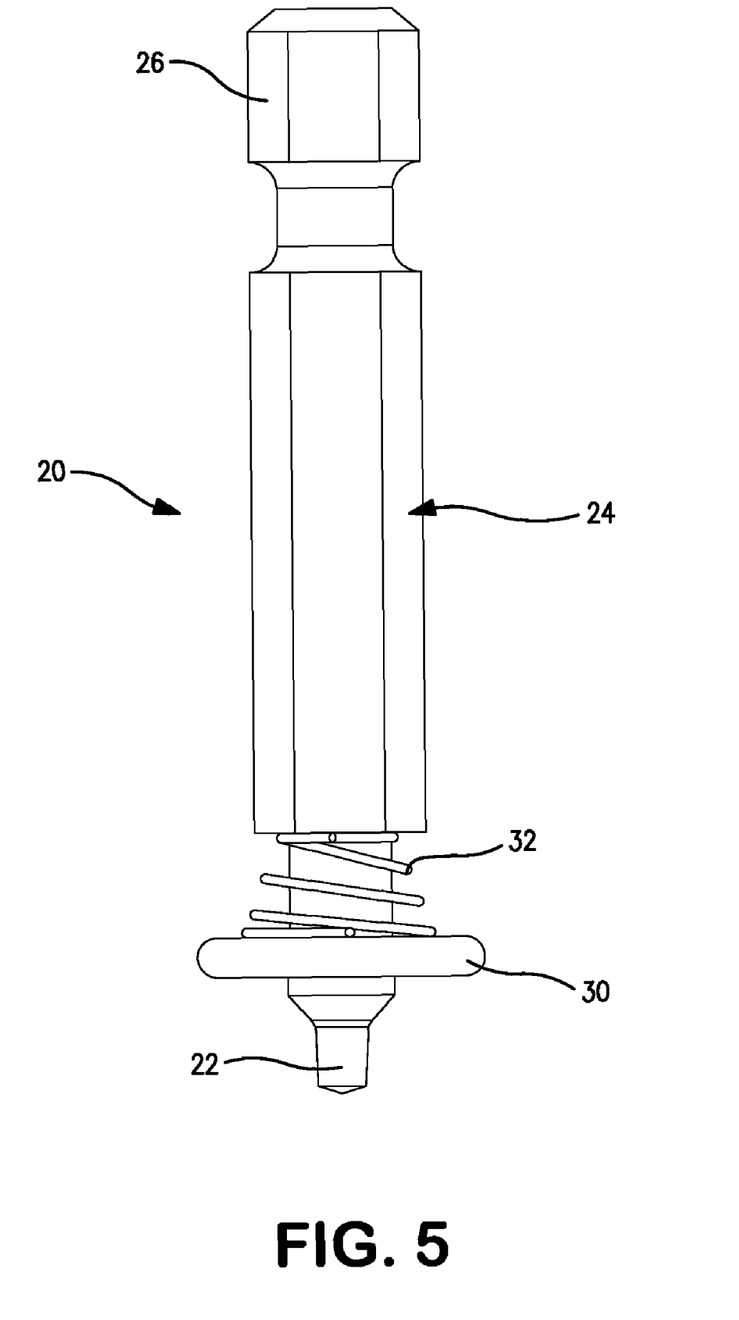
FIG. 5 is a side elevational view of a driver tool employed in the plug finishing method.
Figure 6:
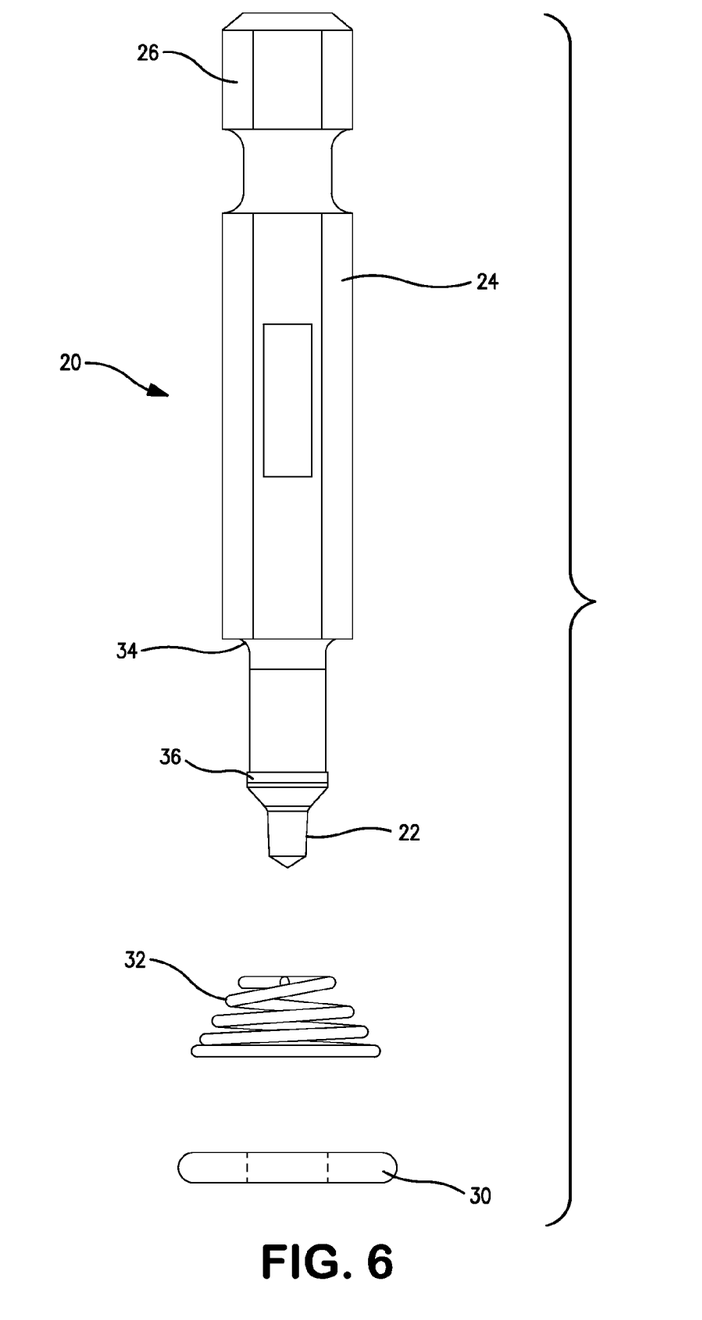
FIG. 6 is an exploded side view of the driver tool of FIG. 5.
Figure 7A:
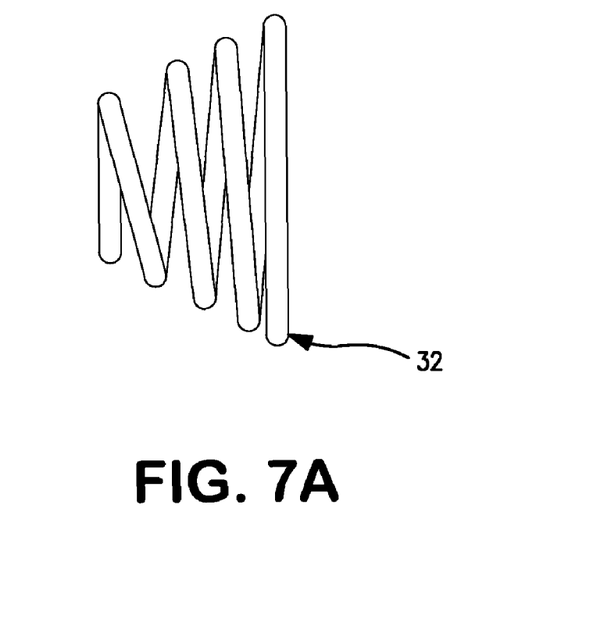
FIGS. 7A and 7B are respectively enlarged side and end views of a spring employed in the driver tool of FIG. 5.
Figure 7B:
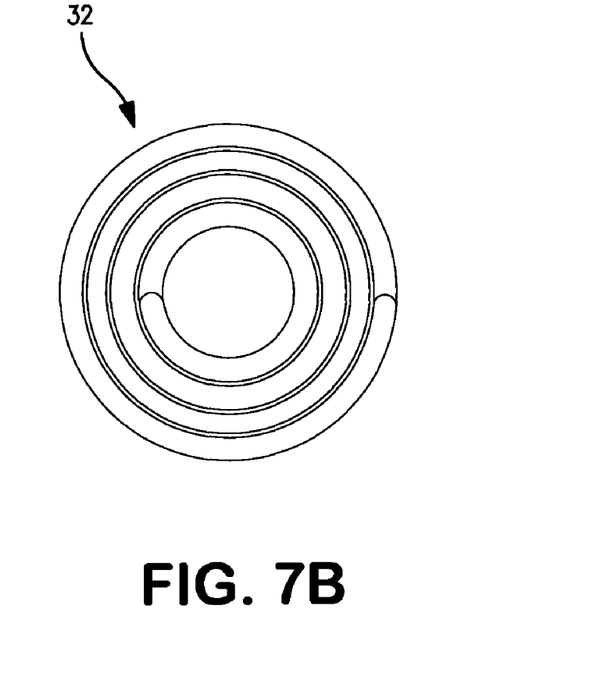
Figure 8:
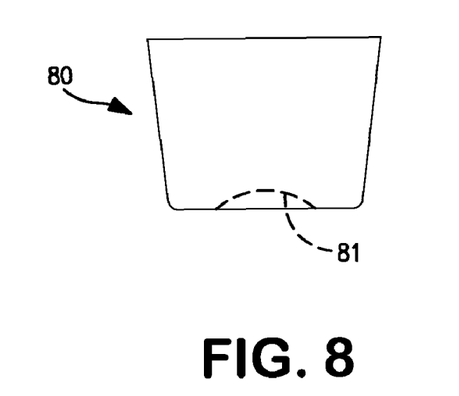
FIGS. 8 through 12 are side views illustrating various alternative plugs that may be employed in the plug finishing system.
Figure 9:
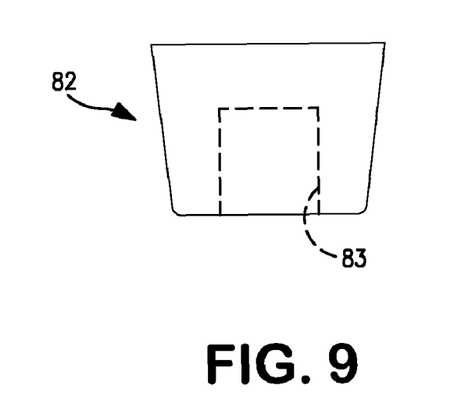
Figure 10:
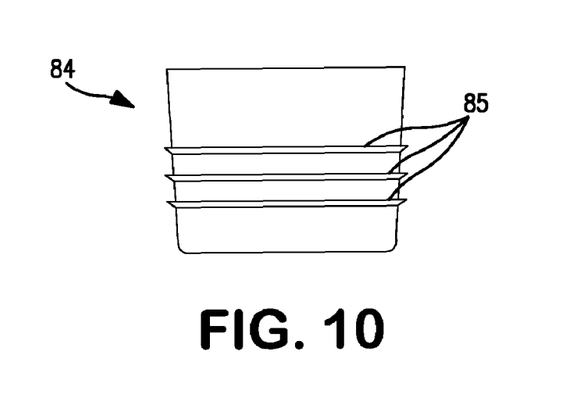
Figure 11:
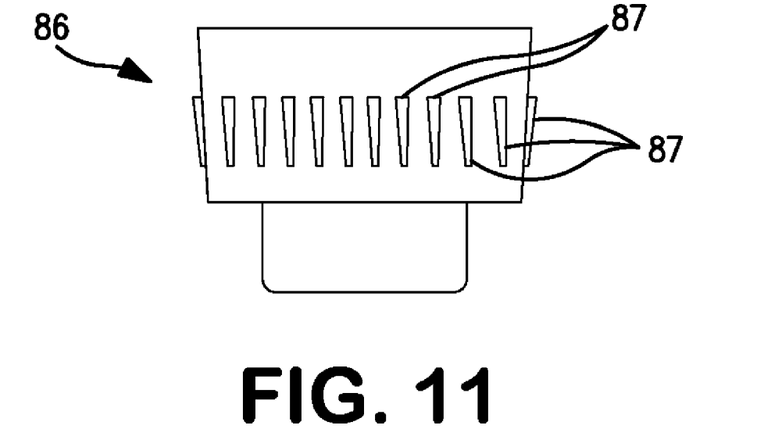
Figure 12:
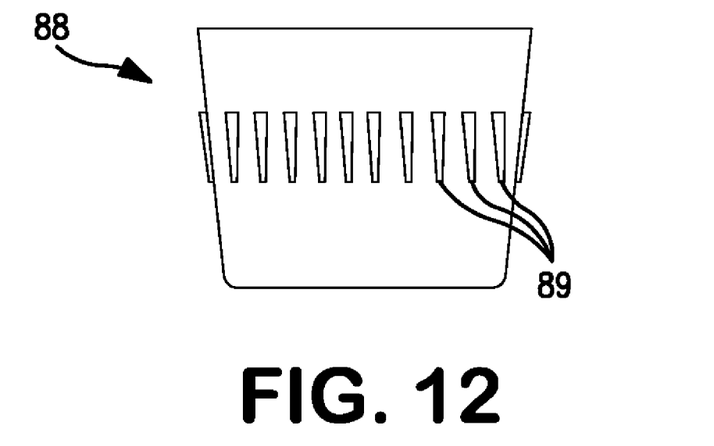

One embodiment of a driver 20 is shown generally in FIGS. 5 through 7. This driver comprises a generally elongated body 24 including opposing ends. One end of the body comprises a tool engagement portion 26 adapted for fastening the driver to a tool such as a drill so that rotational torque and axial force can be applied to the driver. The opposing end of the body comprises the fastener bit 22. The fastener bit is configured to mechanically interengage the head of a fastener so that the user can apply axial force and rotational torque to the fastener. The fastener bit 22 can be of any configuration suitable to mechanically interengage with the head of a selected fastener, for example slotted, cross, Torx™, square (as illustrated), hex or splined. In one embodiment (not illustrated) the fastener bit is removably attached to the driver. In this embodiment fastener bits can be replaced when worn or to use the driver with fasteners of different head designs.

Advantageously, the stop 30 limits penetration of the driver tool into the cover board, thereby limiting penetration depth of the fastener and depth of the counterbore. The stop may optionally comprise a rotating member such as a bearing. The rotating member allows the driver, except for the stop portion in contact with the cover board, to continue rotating until the desired fastener depth is reached thereby lessening marking of the cover board.

A variety of fastener designs are useful with this method. The fastener length is chosen to provide mechanical fastening of the cover board to the support taking into account factors such as counterbore depth and cover board thickness. Naturally, the fastener head would be suitable for interengagement with the fastener bit. Some advantageous fasteners are the TrapEase® and TrapEase® II deck screws available from OMG, Inc. of Agawam, Mass.

With reference to FIGS. 5 through 7, the disclosed driver assembly 20 is adapted to drive a fastener such as the TrapEase® II deck screws of OMG, Inc. of Agawam, Mass. into the composite deck material. In one preferred form, the head 52 of the fastener has a diameter of 0.260 inches. The driver has a No. 1 square drive bit 22 and is adapted to drive the deck screw so that a counterbore at a predetermined depth is produced by the head of the fastener. The upper shank 26 has a hexagonal shape for retention in the chuck of the torque gun. A washer 38 is formed from Delrin® material and pressed onto the lower cylindrical shank. The inside diameter of the washer 38 is greater than the shank portion to which it is retained to permit longitudinal sliding and rotation. Annular shoulders 34 and 36 are formed on the lower cylindrical shank at opposing ends to retain and limit the axial travel of the washer. With reference to FIGS. 7A and 7B, a collapsible conical compression spring 32 engages between the end of the shank and the washer to bias the washer toward the drive end of the driver. The washer engages the top surface of the cover board and allows rotation of the bit while remaining stationary. The latter washer engagement minimizes moving while functioning as a stop.

The fastener is then interengaged through the socket head by the driver bit 22 and is torqued. During the driving process, the washer compresses the spring 32 and is forced toward a shoulder of the shank, which fixes the depth of the head to the deck screw and the depth of the counterbore and whereupon further driving is terminated. The retainer washer 30 rotates independently of the driver so that the surface of the deck board is not marred during the driving and setting of the fastener—which will be set at a predetermined depth for a given application.

A plug 60 is inserted into the counterbore to hide the fastener from view. Preferred plug embodiments are shown in FIGS. 2A, 2B, 3A, 3B, 4A and 4D. A preferred configuration of the plug is a plug having an enlarged portion and a reduced portion of cylindrical form such as plugs 60A, 60B and 60C. The enlarged portion has a substantially uniform diameter which is commensurate with the diameter of the counterbore. A tapered transition portion 64 is interposed with a reduced cylindrical portion 66. The outer end surface 68, upon installation, will be co-planar with the top surface 14 of the cover board. The inner end surface 69 engages or is adjacent to the top of the head 52 of the fastener. The reduced portion facilitates the initial insertion into the counterbore, and functions to self center the plug. In addition, the reduced portion 66 provides an annular cavity which may accommodate any remnant materials above the head which are formed during the driving process.

The plugs 60A, 60B and 60C are dimensioned for use in conjunction with the foregoing described deck screws and the driver having a preset depth of 5/16 inch. Dimensions for specific plugs are set forth in Table I below.

TABLE I

| | $h_1$ | $h_2$ | $w_1$ | $w_2$ | $h_3$ | a |
|---|---|---|---|---|---|---|
| 60A | .255 | .150 | .275 | .225 | .190 | — |
| 60B | .250 | .125 | .265 | .210 | — | 53° |
| 60C | .250 | .125 | .265 | .205 | — | 35° |

Plugs 80, 82, 84, 86 and 88 are characterized by truncated conical tapers wherein the upper portion has a large diameter which is generally commensurate with the diameter of the counterbore. Plugs 80 and 82 may contain lower recesses 81 and 83 to accommodate the insertion into the counterbores. Plug 84 has circumferential ribs 85 which engage against the upper wall of the counterbore to facilitate retention within the counterbore. Plugs 86 and 88 include longitudinally extending ribs 87 and 89 around the periphery which also engage the upper wall of the counterbore.

Figure 16:
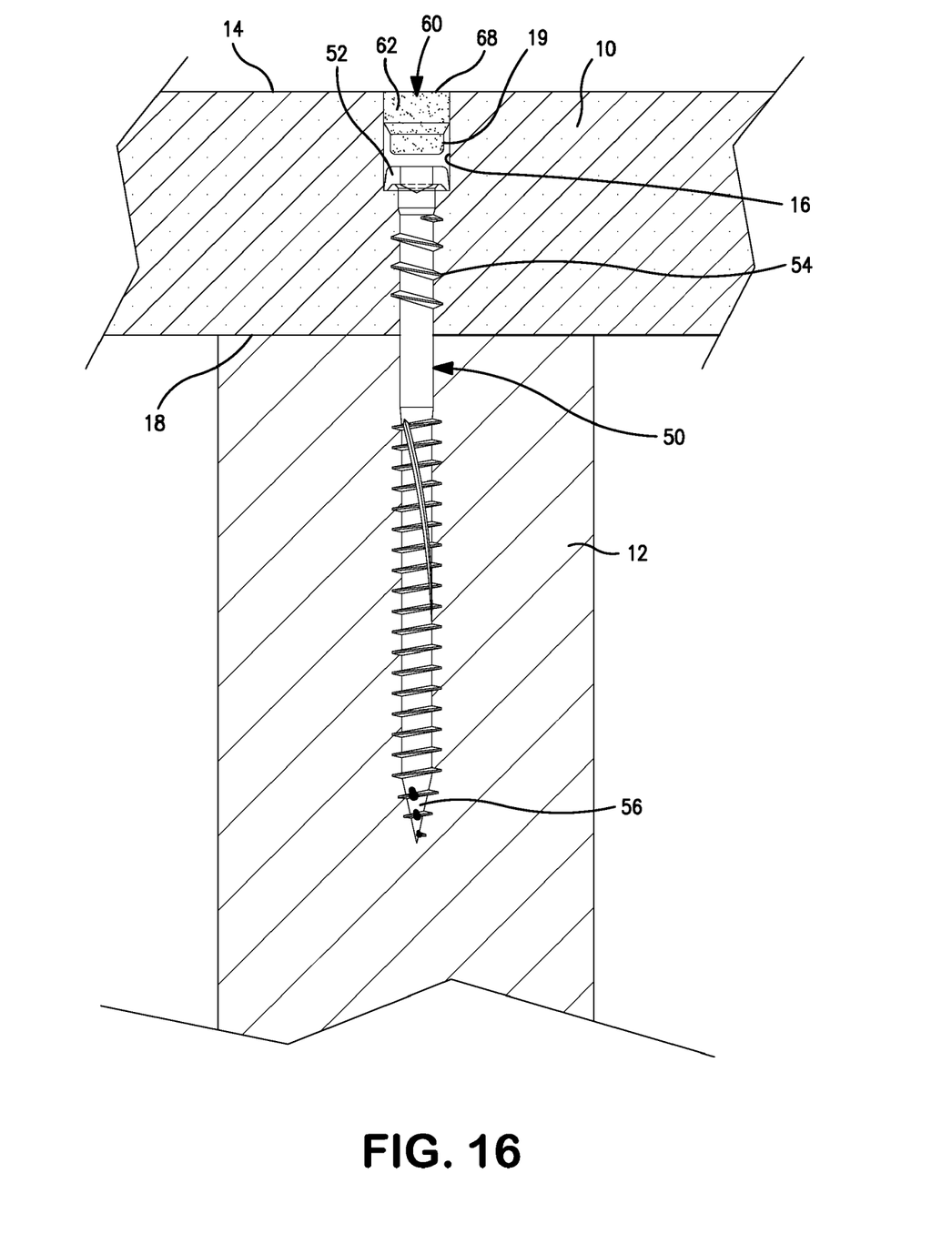
FIG. 16 is an enlarged sectional view illustrating a plug received in counterbore above a fastener driven into a joist.

In one preferred application, a package (not illustrated) of substantially identical plugs manufactured from the same material as the cover board is provided. The plugs are also dimensioned for a given fastener. Fasteners are then driven through the cover board via the driver so that a counterbore having a pre-established depth is created above each of the countersunk fastener heads. For each of the counterbores 16, a plug 60 is selected and tapped into the counterbore so that the top surface 68 of the plug is coplanar with the surface 14 of the cover board as best illustrated in FIG. 16. The plug is dimensioned so that the peripheral surface adjacent the top surface 68 snugly engages the upper wall of the counterbore. An annular cavity 19 is defined between the reduced portion 66 and the wall of the counterbore. Lower end surface 69 of the plug 60 upon installation may be spaced from the top of the head 58.

In some embodiments, the plugs (illustrated in FIGS. 8-12) have a truncated conical taper with the exterior end having a larger diameter than the interior end. The slight diametrical taper eases insertion of the plug into the counterbore. The plugs are advantageously formed of the same material as the cover board to aesthetically blend with the cover board exterior surface when inserted. Thus, if the cover board is a composite deck board comprising a polymer, the plug can be made from the same composite material. If the cover board is a trim piece comprising a polymer, a composite/plastic and/or cellular PVC, the plug can similarly be made from the same material. The taper angle, which is optimal, is typically specific for a given material. Alternatively, the plug may also be made of materials different than the cover board.

Figure 13:
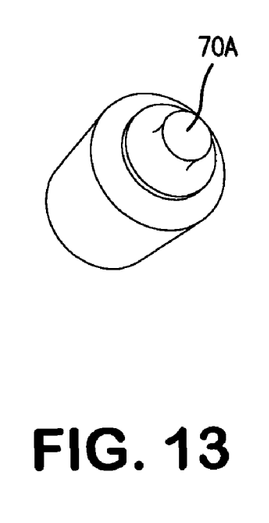
FIGS. 13 through 15 are top perspective views illustrating various decorative patterns that may be employed for trim plugs used for the plug finishing system.
Figure 14:
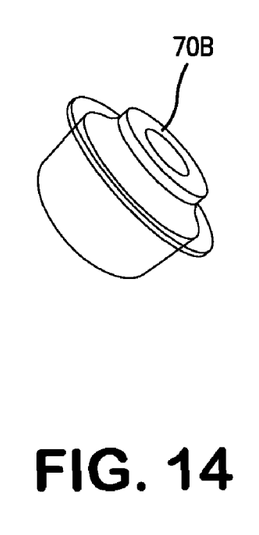
Figure 15:
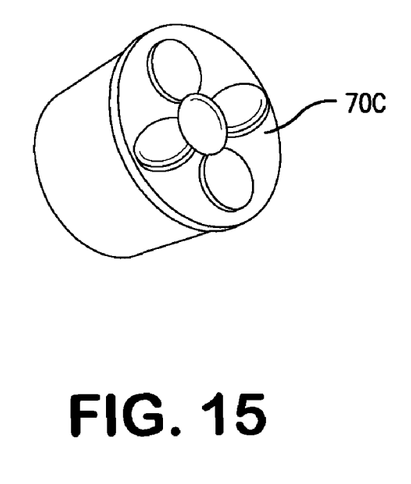

In some embodiments, such as shown in FIGS. 13, 14 and 15, the external face 70A, 70B, 70C of the plug can comprise decorative patterns, coloring or indicia. These embodiments can be aesthetically desirable. Adhesive can optionally be used to help maintain the plug in the counterbore if desired.

For the embodiment of FIGS. 13 through 15, the method remains substantially the same as previously described. However, the cover board is a horizontal or vertical trim board, for example, a natural wood trim board or a polymer comprising trim board such as the polyvinyl chloride trimboard sold under the tradename AZEK® by AZEK Trimboards of Moosic, Pa. In addition, the upper decorative portions may extend above the surface of the trim board upon installation.

While preferred embodiments have been set forth for purposes of illustration, the foregoing description should not be deemed a limitation of the disclosure herein. Accordingly, various modifications, adaptations and alternatives may occur to one skilled in the art without departing from the spirit and scope of the present disclosure.

The invention claimed is:

1. An installation comprising:
a support;
a cover member having opposed surfaces and composed of a first material;
a fastener fastening said cover member to said support and having a head disposed between said surfaces with a counterbore between said head and one surface; and
a plug disposed in said counterbore and composed of said first material and having an exterior surface co-planar with said one surface and having a portion of reduced diameter remote from said exterior surface, said plug having a peripheral surface adjacent said exterior surface which engages a circumferential wall portion of said counterbore adjacent said one surface in a generally force fit relationship said plug having an upper enlarged cylindrical portion and a lower reduced cylindrical portion with a tapered transition portion between said upper enlarged cylindrical portion and said lower reduced cylindrical portion, and said upper enlarged cylindrical portion, of said plug engaging said counter bore and said lower reduced cylindrical portion spaced from said counter bore to form an annular cavity.

2. The installation of claim 1 wherein said plug has an enlarged cylindrical portion and a coaxial reduced cylindrical portion.

3. The installation of claim 1 wherein said first material is selected from the group consisting of natural wood, wood/plastic composite, polymer and cellular PCV.

4. The installation of claim 1 wherein the fastener head has a diameter and the counterbore has a diameter less than the diameter of the head.

5. The installation of claim 1 wherein said cover member is a trim board.

6. The installation of claim 1 wherein there are a plurality of identical fasteners and identical plugs and wherein:
each fastener fastens said cover member to said support and has a head disposed between said surfaces with a counterbore between said head and one surface; and
each plug is disposed in said counterbore and composed of said first material and has an exterior surface co-planar with said one surface and has a portion of reduced diameter remote from said exterior surface, said plug having a peripheral surface adjacent said exterior surface which engages a circumferential wall portion of said counterbore adjacent said one surface in a generally force fit relationship.

* * * * *